(No Model.) 3 Sheets—Sheet 2.
J. H. SIEGRIST, Jr.
AUTOMATIC LUBRICATOR FOR STEAM ENGINES.
No. 410,035. Patented Aug. 27, 1889.
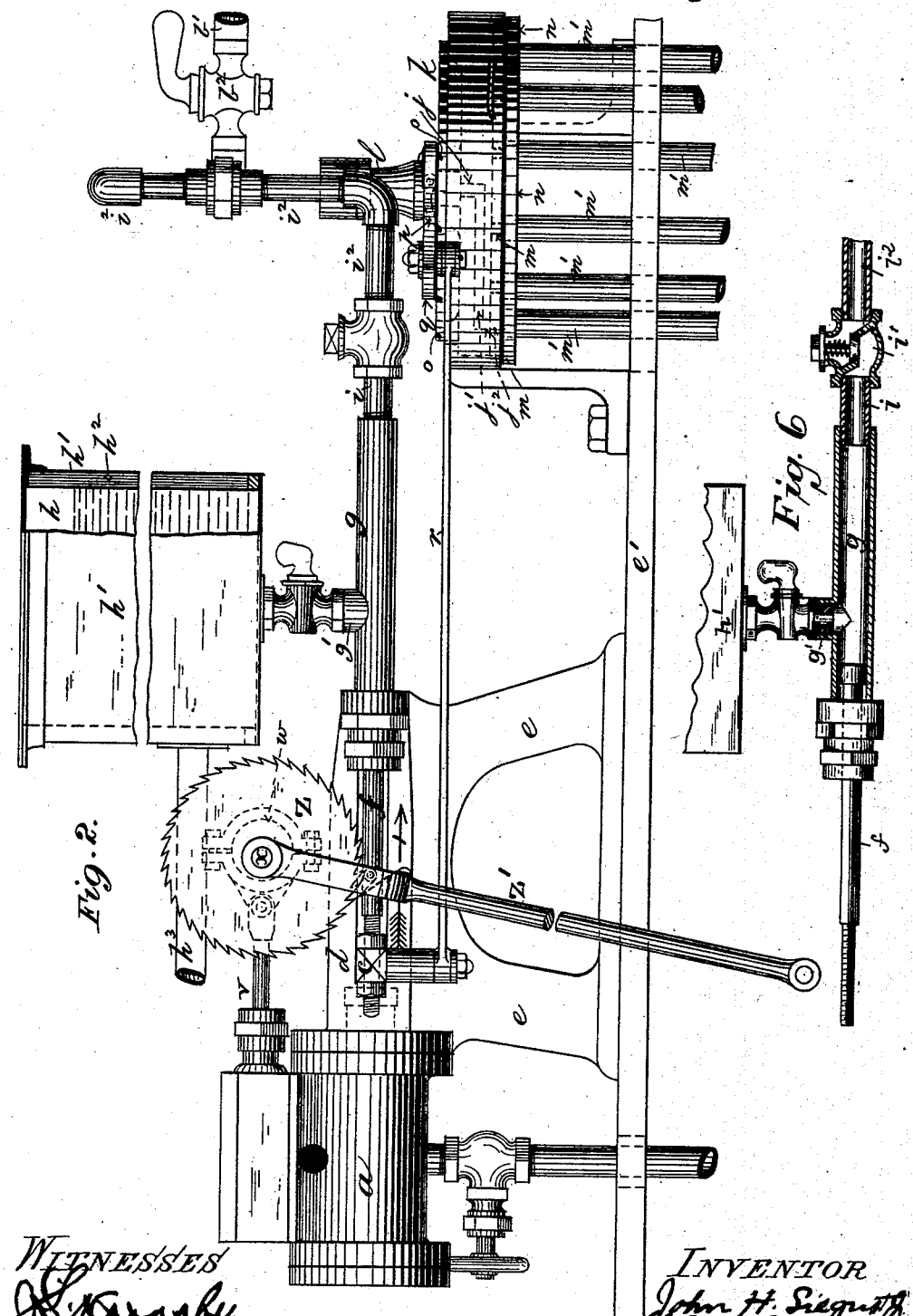

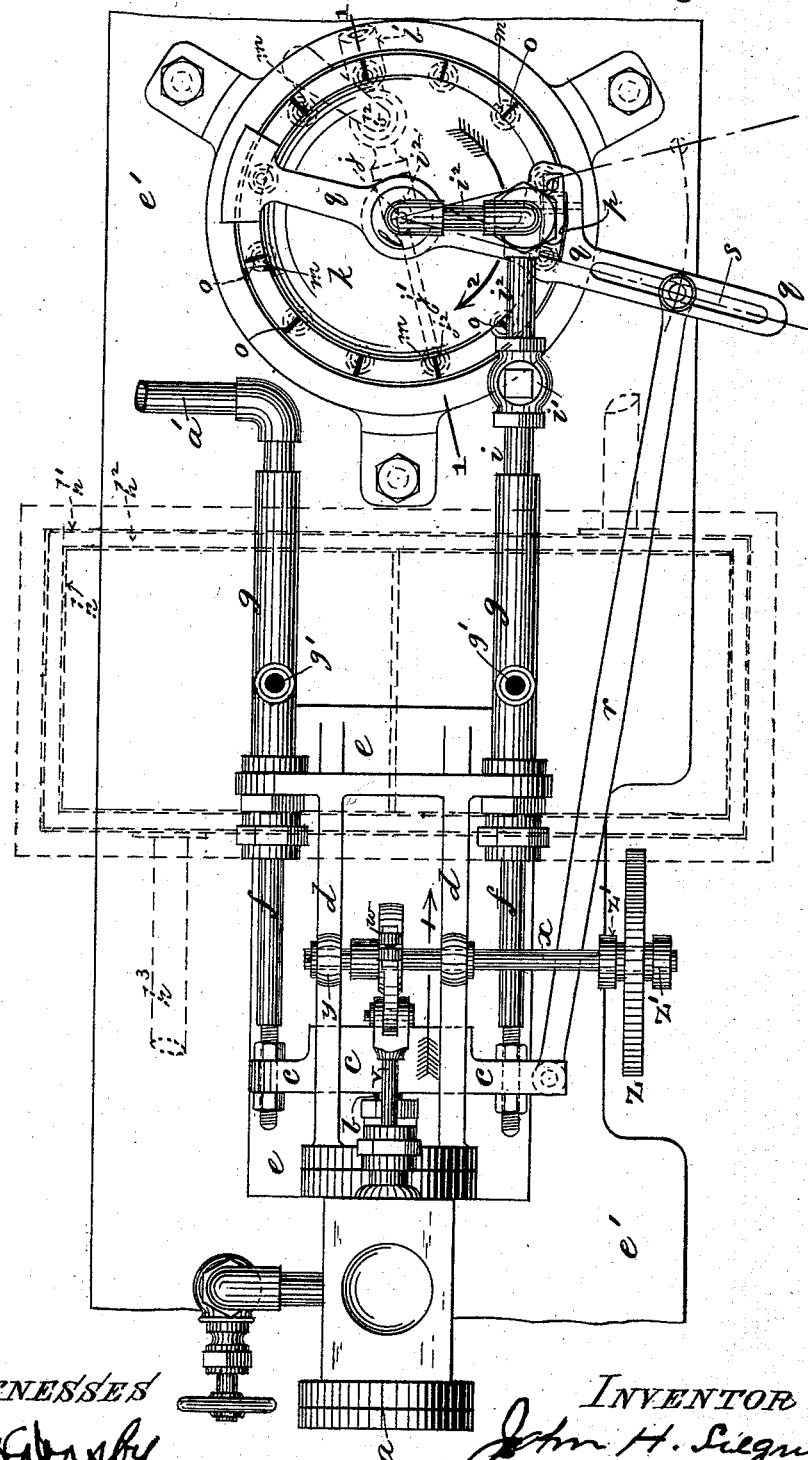

(No Model.)  3 Sheets—Sheet 3.
J. H. SIEGRIST, Jr.
AUTOMATIC LUBRICATOR FOR STEAM ENGINES.
No. 410,035.  Patented Aug. 27, 1889.
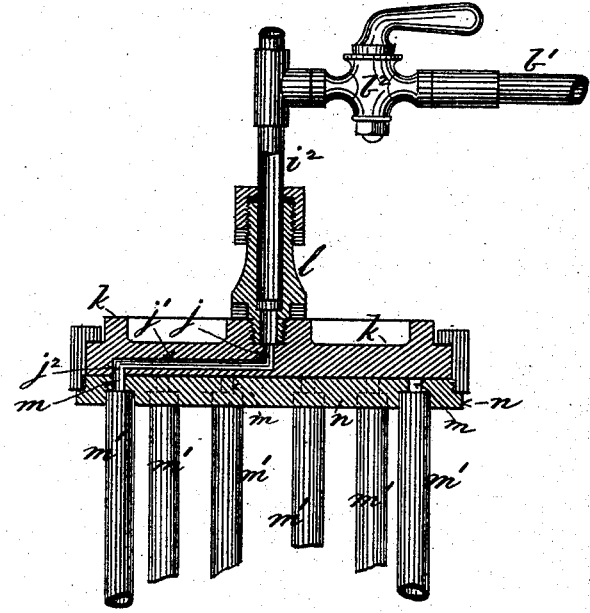
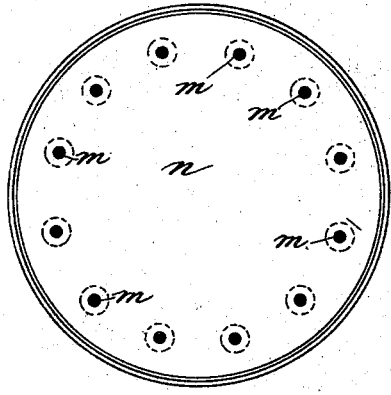
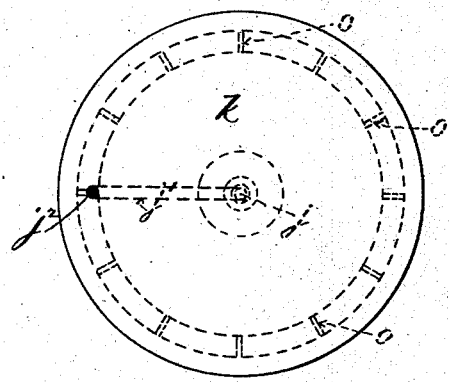

UNITED STATES PATENT OFFICE.

JOHN H. SIEGRIST, JR., OF ST. LOUIS, MISSOURI, ASSIGNOR OF ONE-HALF TO HENRY A. SIEGRIST, OF SAME PLACE.

AUTOMATIC LUBRICATOR FOR STEAM-ENGINES.

SPECIFICATION forming part of Letters Patent No. 410,035, dated August 27, 1889.

Application filed November 2, 1888. Serial No. 289,806. (No model.)

*To all whom it may concern:*

Be it known that I, JOHN H. SIEGRIST, Jr., a citizen of the United States, residing at the city of St. Louis, State of Missouri, have invented a certain new and useful Improvement in Automatic Lubricators for Steam-Engines and other Machinery, of which the following is a full, clear, and exact description.

My invention relates to improved apparatus for automatically lubricating the various parts of locomotive or stationary engines and other machinery while in motion, and has for its object to obviate the necessity of stopping the machinery for the purpose of oiling and the danger of oiling while the machinery is in motion; also to insure a regular and uniform lubrication according to the speed of the engine, which is unattainable with the present systems.

It consists in a combination of apparatus, comprising an ordinary steam-cylinder and piston, the rod of which is attached to a cross-head operating one or more pumps for forcing oil from a tank or vessel through a passage which is formed in a circular plate, and caused to communicate consecutively with corresponding passages formed through a lower concentric plate by means of a ratchet-lever fulcrumed at the center of the upper plate and adjustably connected by a rod with the piston-rod cross-head, the pawl of the ratchet-lever engaging in ratchets radially arranged on the upper circular plate. The cylinder is supplied with steam through an ordinary slide-valve controlled by an eccentric, on the shaft of which is fixed a ratchet-wheel engaged by a ratchet-lever, which is connected with any convenient reciprocating part of the engine or machinery to be lubricated, the whole operating so that on the consequent successive vibrations of the ratchet-lever fixed to the eccentric-shaft the ratchet-wheel is rotated and shifts the eccentric into the proper positions for reciprocating the piston with its rod and cross-head, whereby the ratchet-lever of the upper circular plate is vibrated, and partially rotates the latter, so that its passage is brought successively into communication with a corresponding passage in the lower plate, and thereby allows the oil, which is simultaneously delivered by the pump or pumps from the tank or vessel, to pass through the said passages and through a pipe leading therefrom to any required part of the engine or machinery to be lubricated.

On the accompanying drawings, Figure 1 represents a plan of my improved automatic lubricator; Fig. 2, a side elevation thereof; Fig. 3, a vertical sectional view through line 1 1 in Fig. 1, broken away; Fig. 4, a detached plan of the lower circular plate seen in Fig. 3; Fig. 5, an inverted plan, detached, of the upper circular plate seen in Fig. 3; and Fig. 6 is a detail view of the pump.

Like letters of reference denote like parts in all the figures.

$a$ represents a steam-cylinder provided with a piston and slide-valve, which parts, being of the ordinary construction, need no illustration.

To the outer end of the piston-rod $b$ is attached a cross-head $c$, mounted in and projecting at each end beyond horizontal guides $d$, which, with the cylinder $a$, are carried by the framing $e$, fixed on bed-plate $e'$, the latter being secured to any suitable foundation or support adjacent to the engine or machinery to be lubricated.

To the cross-head $c$, at each side of the piston-rod $b$, is adjustably attached the outer end of the ram or plunger $f$ of a pump $g$, which is horizontally arranged and secured to the framing $e$ in any suitable manner.

One or more pumps may be used at each or either side of the piston-rod $b$, as found convenient, according to the extent of lubrication required.

The pump which I have shown in the drawings is composed of a cylinder $g$ and a plunger $f$ working therein. In one side of the cylinder $g$, in front of the limit of the rear stroke of the plunger, is an inlet-pipe $g'$, and at its front end is a delivery-pipe $i$, provided with a check-valve $i'$, opening outward from the pump-cylinder.

The suction branches $g'$ of the pumps $g$ communicate with a tank or vessel $h$, (shown in Fig. 2 broken away, and by dotted lines in Fig. 1,) which is divided into separate compartments for holding different grades of oil, and surrounded by an outer casing $h'$, between which and the tank $h$ is left a space $h^2$, into which the exhaust-steam from the cylinder $a$, or other source, is turned by the pipe $h^3$, for heating the oil contained in the tank $h$.

The delivery-pipe $i$ from one (or more) of the pumps $g$ is provided with a check-valve $i'$ and communicates with a pipe $i^2$, which descends vertically and communicates with a central opening $j$ (see particularly Figs. 3 and 5) in the upper surface of a circular plate or disk $k$, the junction of the pipe $i^2$ with this central opening $j$ being effected by a gland and stuffing-box $l$, which is secured to the center of the plate $k$ and surrounds the pipe $i^2$, whereby the plate $k$ is enabled to rotate when so constrained without interfering with the free flow of oil through the pipe $i^2$, as hereinafter described.

From the central opening $j$ a passage $j'$ is formed radially within the plate $k$ to a suitable distance and terminates in an outlet-passage $j^2$ on the under side of the plate $k$, for communicating, as the latter is rotated, with each of a series of passages $m$, arranged at equal distances apart along a circle radial to the center of a lower fixed circular plate $n$, which is concentric with and forms a bed for the upper plate $k$, the passages $m$ passing through the plate $n$ and communicating on the under side of the latter with pipes $m'$, which are conducted in any desired direction to the various parts of the engine or other machinery to be lubricated.

On the upper surface of the plate $k$ are arranged radially to the center thereof and at suitable distances apart notches or ratchets $o$, which are engaged by the pawl $p$ of a ratchet-lever $q$, fulcrumed at the center of the plate $k$, and connected with the piston-rod cross-head $c$ by a rod $r$, one end of which is adjustable in a slot $s$, formed along the outer portion of the ratchet-lever $q$, whereby the vibration imparted to the latter by the rod $r$ can be lengthened or shortened, as hereinafter more particularly explained. The pawl $p$ works through a slot formed therefor vertically through the ratchet-lever $q$, the rear end of the pawl $p$ being fixed to the upper surface of the lever $q$ in rear of the said slot, and its free end bearing normally against the upper surface of the notched portion of the plate $k$, so that on the vibration of the lever $q$ in one direction the nose of the pawl $p$ springs into one of the notches $o$ of the plate $k$, which is thereby partially rotated to an extent corresponding with the vibration of the lever $q$, as hereinafter more particularly referred to. The slide-valve stem $v$ of the steam-cylinder $a$ is connected with an eccentric $w$, which is fixed on a shaft $x$, mounted in bearings $y$, carried by the cross-head guides $d$, or other convenient part of the framing $e$. On the eccentric-shaft $x$ is fixed a ratchet-wheel $z$, which is engaged by the pawl of a ratchet-lever $z'$.

In general operation, the ratchet-lever $z'$, being connected to any convenient reciprocating part of the steam-engine or other machinery to be lubricated, is thereby vibrated and intermittently rotates the ratchet-wheel $z$, shaft $x$, and eccentric $w$, and upon two or more vibrations of said lever $z'$ the slide-valve of the steam-cylinder $a$ will be moved a sufficient distance to open one of the steam-ports to the cylinder, and the continued vibration of the lever will move the slide-valve intermittently in the opposite direction until the other steam-port is opened, and so on, every two or more vibrations of the lever $z'$ establishing communication with the cylinder $a$ on one side or the other of the piston, which causes the cross-head $c$ to be reciprocated in its guides $d$. As the cross-head $c$ travels forward in the direction indicated by arrow 1 in Figs. 1 and 2, the ratchet-lever $q$ on the circular plate $k$ is vibrated in the same direction and moves its pawl $p$ over the ratchets $o$ on the plate $k$ without affecting the position of the latter, and at the same time the oil contained in the chamber of the force-pump $g$ is delivered by the ram or plunger $f$ through the pipes $i$ $i^2$, opening $j$, passages $j'$ $j^2$, and through one of the passages $m$ in the lower fixed plate $n$, and thence by pipe $m'$ to the corresponding part of the engine or other machinery to be lubricated. On the return-stroke of the cross-head $c$ and ratchet-lever $q$ the pawl $p$ engages with one of the notches or ratchets $o$ of the plate $k$, and partially rotates the latter in the direction of arrow 2 in Fig. 1, so as to bring the passage $j^2$ immediately over and in communication with the succeeding passage $m$ of the plate $n$, the pump $g$ at the same time drawing oil from one of the compartments of the tank $h$, ready for forcing it through this succeeding passage $m$ and its pipe $m'$ for lubricating another part of the engine or machinery on the next forward stroke of the cross-head $c$, and so on until the oil has been forced successively through the entire series of passages $m$ and pipes $m'$ of the lower fixed plate $n$, when the operation is repeated.

If desired, the number of passages $m$ and pipes $m'$ may be increased or diminished and the vibration of the ratchet-lever $q$ varied accordingly by adjusting the end of the connecting-rod $r$ along the slot $s$ of the lever $q$.

As shown in Fig. 1, the delivery-pipe $a'$ of the farther pump $g$, which may be supplied with a finer quality of oil from another compartment of the tank $h$, is not connected with the distributing apparatus previously described for directing the common oil through the pipes $m'$, but leads directly to other parts of the engine or machinery for lubricating the same at every stroke of the pump continuously.

By this invention the lubrication through the pipes $m'$ is rendered regular and uniform, according to the speed of the engine or other machinery—that is to say, the greater the speed and the vibration of the ratchet-lever $z'$ the more frequently will the oil be forced through each of the pipes $m'$ to its corresponding part of the machinery, and vice versa.

By means of a pipe $b'$ communicating with the central pipe $i^2$ of the distributing apparatus and provided with a valve $b^2$, steam may be passed from any convenient source through the various passages and pipes of the apparatus for cleaning the same when required.

I claim as my invention—

1. In a multiple lubricator for lubricating machinery, the combination, with a bed-plate having a series of ports arranged in a circle or equal distances from the center, of a centrally-pivoted disk having a receiving-port centrally of the disk, and a radial passage leading therefrom and of such length as to register with the successive ports in the bed-plate, substantially as and for the purposes described.

2. In a multiple lubricator, the combination, with a bed-plate having a series of ports arranged at equal distances from its center, of a centrally-pivoted rotary disk having a receiving-port and a radial passage leading therefrom and of such length as to register successively with the ports in the bed-plate, a pump for delivering oil to the receiving-port in the rotary disk, and mechanism for rotating the disk from the pump-piston, substantially as and for the purposes described.

3. In a multiple lubricator, the combination, with a rotary oil-delivery disk or valve, of a pump for forcing oil to the delivery disk or valve, mechanism for rotating the disk from the piston of said pump, and a steam-cylinder for actuating the pump, said steam-cylinder provided with a valve actuated from a moving part of the machinery to be lubricated, substantially as and for the purposes described.

4. In apparatus for automatically lubricating machinery, the combination of a circular plate having a central supply-pipe and passage therefrom, said passage communicating successively with each of a series of passages formed through a lower plate and provided with pipes communicating respectively with the various parts of the machinery to be lubricated, a force-pump drawing oil from a tank or vessel and delivering the oil through the central supply-pipe of the upper circular plate, means for operating said pump, a ratchet-lever engaging in notches or ratchets on the upper circular plate, with means for vibrating said lever, substantially as shown, and for the purpose described.

5. In apparatus for automatically lubricating machinery, the combination of a circular plate having a central supply-pipe and passage therefrom, said passage communicating successively with each of a series of passages formed through a lower plate and provided with pipes communicating respectively with the various parts of the machinery to be lubricated, a force-pump drawing oil from a tank or vessel and delivering the oil through the central supply-pipe of the upper circular plate, a cross-head attached to the ram of said pump and reciprocated by the piston of an ordinary steam-cylinder provided with a slide-valve, said valve being controlled by an eccentric fixed on a shaft, a ratchet-lever engaging in notches or ratchets on the upper circular plate, a rod connecting said lever to the cross-head, a ratchet-wheel fixed on the eccentric shaft, with a ratchet-lever engaging in said wheel and adapted to be connected to any convenient reciprocating part of the machinery to be lubricated, substantially as shown, and for the purpose described.

In testimony whereof I affix my signature, in presence of two witnesses, this 29th day of October, 1888.

JOHN H. SIEGRIST, JR.

Witnesses:
SARA L. SCHRADER,
PAUL BAKEWELL.